United States Patent
Naegelkraemer et al.

(10) Patent No.: US 12,176,765 B2
(45) Date of Patent: Dec. 24, 2024

(54) ELECTRIC MACHINE

(71) Applicant: Dr. Ing. h.c. F. Porsche Aktiengesellschaft, Stuttgart (DE)

(72) Inventors: Jan Naegelkraemer, Stuttgart (DE); Christian Koenen, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/895,084

(22) Filed: Aug. 25, 2022

(65) Prior Publication Data
US 2023/0064259 A1    Mar. 2, 2023

(30) Foreign Application Priority Data
Sep. 2, 2021   (DE) .................... 10 2021 122 740.2

(51) Int. Cl.
*H02K 1/32*    (2006.01)
*H02K 9/00*    (2006.01)

(52) U.S. Cl.
CPC .................... *H02K 1/325* (2013.01)

(58) Field of Classification Search
CPC .......... H02K 1/24; H02K 1/325; H02K 3/527; H02K 9/19
See application file for complete search history.

(56) References Cited

U.S. PATENT DOCUMENTS

| | | | | |
|---|---|---|---|---|
| 3,008,786 A * | 11/1961 | Costello | ................ | H02K 3/527 310/260 |
| 5,140,204 A * | 8/1992 | Cashmore | .............. | H02K 9/225 310/214 |
| 6,772,504 B2 * | 8/2004 | Weidman | ................. | H02K 1/32 29/598 |
| 10,523,079 B2 * | 12/2019 | Huang | ..................... | H02K 3/52 |
| 11,418,077 B2 * | 8/2022 | Krais | ..................... | H02K 9/197 |
| 2003/0030333 A1 * | 2/2003 | Johnsen | ................... | H02K 1/32 310/54 |
| 2014/0091651 A1 * | 4/2014 | Dorfstatter | ............... | H02K 3/24 310/58 |
| 2016/0204663 A1 * | 7/2016 | Huang | .................. | H02K 1/325 310/59 |

(Continued)

FOREIGN PATENT DOCUMENTS

AT    521063 A2    10/2019
DE    102017218828 A1    4/2019

(Continued)

*Primary Examiner* — Thomas Truong
(74) *Attorney, Agent, or Firm* — LEYDIG, VOIT & MAYER, LTD.

(57) ABSTRACT

An electrical machine, as a prime mover of an electrically driven motor vehicle, including a rotor and a stator, wherein the stator surrounds a substantially cylindrical space area, in which the rotor is rotatably arranged, the rotor includes a rotor shaft, on which a rotor core is arranged, the rotor core including groove-like recesses which extend toward the rotor shaft, electrically conductive conductors of a rotor winding and a displacement body for arranging the conductors in the groove-like recess are provided in the groove-like recesses, and at least one cooling channel, which extends in a longitudinal direction of the rotor shaft, is arranged in at least one groove-like recess.

17 Claims, 3 Drawing Sheets

(56) References Cited

U.S. PATENT DOCUMENTS

| | | | |
|---|---|---|---|
| 2019/0123612 A1 | 4/2019 | Weber et al. | |
| 2019/0393747 A1* | 12/2019 | Tang | H02K 5/20 |
| 2020/0212742 A1* | 7/2020 | Sridharan | H02K 1/16 |
| 2020/0295616 A1 | 9/2020 | Grabherr et al. | |
| 2020/0412193 A1 | 12/2020 | Eilenberger | |

FOREIGN PATENT DOCUMENTS

| | | |
|---|---|---|
| DE | 102017221805 A1 | 6/2019 |
| DE | 102018220810 A1 | 6/2020 |

* cited by examiner

ELECTRIC MACHINE

CROSS REFERENCE TO RELATED APPLICATIONS

This application claims benefit to German Patent Application No. DE 10 2021 122 740.2, filed on Sep. 2, 2021, which is hereby incorporated by reference herein.

FIELD

The invention relates to an electric machine, in particular as a prime mover for an electrically drivable motor vehicle.

BACKGROUND

Electrically drivable motor vehicles are known in the prior art. They comprise electric machines that are used for driving the motor vehicle. These electric machines typically comprise a rotor and a stator, which, in operation of the electric machine, experience thermal loading due to the flow of current through the current-carrying conductor of the electric machine and due to eddy current losses and other losses, so that cooling of the electric machine becomes necessary.

In the prior art, stator cooling for cooling the stator of the electric machines is widely known. In this regard, reference is made to AT 521063 A2, DE 10 2017 221 805 A1, and DE 10 2017 218 828 A1. These prior-art publications provide for a formation of cooling channels in the stator for flowing through a coolant for cooling the electric machine. The waste heat generated in the rotor and stator is conveyed by heat conduction to the radially external stator, which waste heat is transferred by heat transfer to the coolant and is discharged with the coolant. The coolant circulates in a cooling circuit and is recooled by means of a provided coolant cooler before it is resupplied to the electric machine.

Such electric machines with stator cooling by means of a coolant have the disadvantage on the one hand that the coolant must be carefully kept away from live parts, which makes the design and sealing complicated, and on the other hand that limits of effective cooling become apparent as the heat conduction across the gap between the rotor and stator is a thermal resistor to limit the heat transfer.

With less effective cooling of the electric machine, the power of the electric machine is also limited, which is in particular hindering for motor vehicles of high driving power.

SUMMARY

In an embodiment, the present disclosure provides an electrical machine, as a prime mover of an electrically driven motor vehicle, comprising a rotor and a stator, wherein the stator surrounds a substantially cylindrical space area, in which the rotor is rotatably arranged, the rotor comprises a rotor shaft, on which a rotor core is arranged, the rotor core comprising groove-like recesses which extend toward the rotor shaft, electrically conductive conductors of a rotor winding and a displacement body for arranging the conductors in the groove-like recess are provided in the groove-like recesses, and at least one cooling channel, which extends in a longitudinal direction of the rotor shaft, is arranged in at least one groove-like recess.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
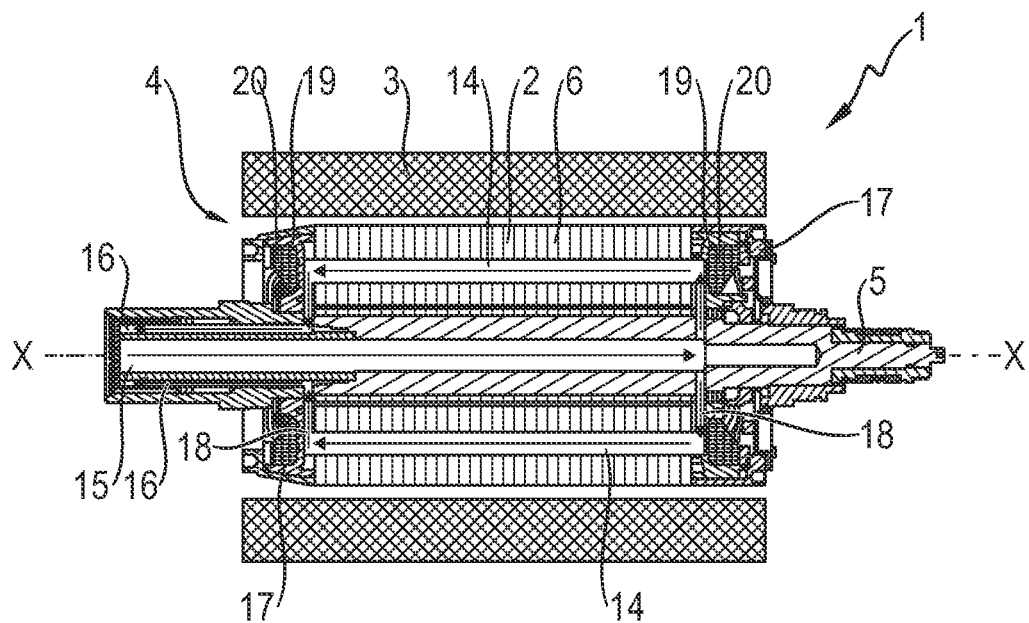
FIG. 1 shows a sectional view of an exemplary embodiment according to the invention of an electric machine with a section along the rotor axis.

In an embodiment, the present invention provides an electric machine that has improved cooling so that the performance of the electric machine, and in particular the continuous power of the electric machine, is increased.

An exemplary embodiment of the invention relates to an electric machine, in particular as a prime mover of an electrically driven motor vehicle, with a rotor and with a stator, wherein the stator surrounds a substantially cylindrical space area, in which the rotor is rotatably arranged, wherein the rotor comprises a rotor shaft, on which a rotor core is arranged, which comprises groove-like recesses, which extend toward the rotor shaft, wherein electrically conductive conductors of a rotor winding and a displacement body for arranging the conductors in the groove-like recess are provided in the respective groove-like recesses, wherein at least one cooling channel, which extends in the longitudinal direction of the rotor shaft, is also arranged in at least one groove-like recess. This ensures that the rotor can be cooled directly by a fluid supply so that improved heat removal directly from the rotor is made possible and a higher continuous power density and higher continuous power can thus be achieved. Furthermore, it is also advantageous that a more homogeneous component temperature can be achieved for this purpose, which allows for a lower-risk design of the operating strategy.

It is particularly advantageous for the rotor core to be formed from a package of rotor plates. This allows for good electrical and thermal properties and simplified assembly.

It is also advantageous if at least one cooling channel, which extends in the longitudinal direction of the rotor shaft, is arranged in a plurality of groove-like recesses or in each groove-like recess. It is in particular advantageous if a cooling channel or a plurality of cooling channels is in each case provided in all groove-like recesses or in groove-like recesses arranged in a manner distributed evenly over the circumference of the rotor. The cooling can thus be achieved in a spatially evenly distributed manner, which has advantages for the even distribution of the temperature of the rotor.

It is also advantageous if the at least one cooling channel is arranged and/or formed in the displacement body and/or between the conductors of the rotor winding. A defined and secure arrangement of the respective cooling channel is thus achieved, which contributes to durability and improved cooling.

It is also expedient if the at least one cooling channel is formed integrally with the displacement body or is integrated into the displacement body and/or is inserted into the displacement body and/or is formed and/or inserted between the conductors of the rotor winding, in particular formed in a manner connected to the conductors. This makes it possible to design the cooling channel very effectively and to reduce assembly costs.

It is also advantageous if the at least one cooling channel is cast together with the conductors of the rotor winding into a casting compound. The cooling channel is thus thermally embedded and mechanically fixed by a simple measure, which advantageously takes place together with the casting of the conductors.

It is also advantageous if the rotor shaft forms fluid channels for supplying and/or discharging a coolant to the rotor and/or from the rotor.

Furthermore, it is advantageous for the rotor to comprise a cover disk on the end side at at least one axial end of the rotor core or at both axial end sides of the rotor core, in which cover disk or in which cover disks at least one fluid channel is provided for supplying and/or discharging a coolant to at least one cooling channel in the rotor. By means of the cover disk or by means of the cover disks, a very good connection of the rotor to a coolant circuit can be achieved, whereby the connection can also be simplified and the coolant can be evenly distributed to the provided cooling channels.

It is particularly advantageous if the rotor winding forms at least one end-side winding head or end-side winding heads of the electrical conductors, which winding head or which winding heads is or are arranged in a fluid channel of the rotor and/or in a fluid channel of a cover disk and can be flowed around by a coolant. The thermally particularly sensitive winding head or the thermally sensitive winding heads can thereby be cooled permanently and stably.

In an exemplary embodiment, it is expedient for the conductors of the rotor winding to be formed as round wire conductors, hairpin conductors, shaped rod conductors, or shaft winding elements. As a result, the conductor can be used in a manner well adapted to the thermal and electrical requirements depending on the application, wherein simplified production and a low installation space requirement can be achieved.

FIGS. 1 to 6 show, in various sectional views, a first to a third exemplary embodiment of an electric machine 1 according to the invention or of a rotor 2 of the electric machine 1. The electric machine 1 is in particular an electric machine 1 that is used as a prime mover of an electrically driven motor vehicle. Such an electric machine 1 can thus be used in a motor vehicle, for example as a sole electric machine 1 for driving wheels of an axle of the motor vehicle or all wheels of the motor vehicle. The electric machine 1 can, for example, also be used with a further electric machine 1 so that, for example, an electric machine 1 is in each case provided for driving wheels of an associated axle of the motor vehicle.

FIGS. 1 to 6 show partially identical parts, which are however not described separately for each exemplary embodiment so that the description of individual exemplary embodiments and their parts also generally applies to other exemplary embodiments.

The electric machine 1 comprises a rotor 2 and a stator 3. The rotor 2 is arranged rotatably about the axis x-x, wherein the stator 3 is arranged stationarily with respect to a motor housing.

The stator 3 is formed, for example, in a substantially hollow cylindrical manner in such a way that it surrounds a substantially cylindrical space area 4, in which the rotor 2 is rotatably arranged.

The rotor 2 comprises a rotor shaft 5, which is arranged in a manner mounted rotatably about the axis x-x.

A rotor core 6 is arranged on the rotor shaft 5. In an advantageous exemplary embodiment, the rotor core 6 is formed from a package of rotor plates 7 stacked on top of one another. The rotor core 6 can also be formed otherwise.

Figure 2:
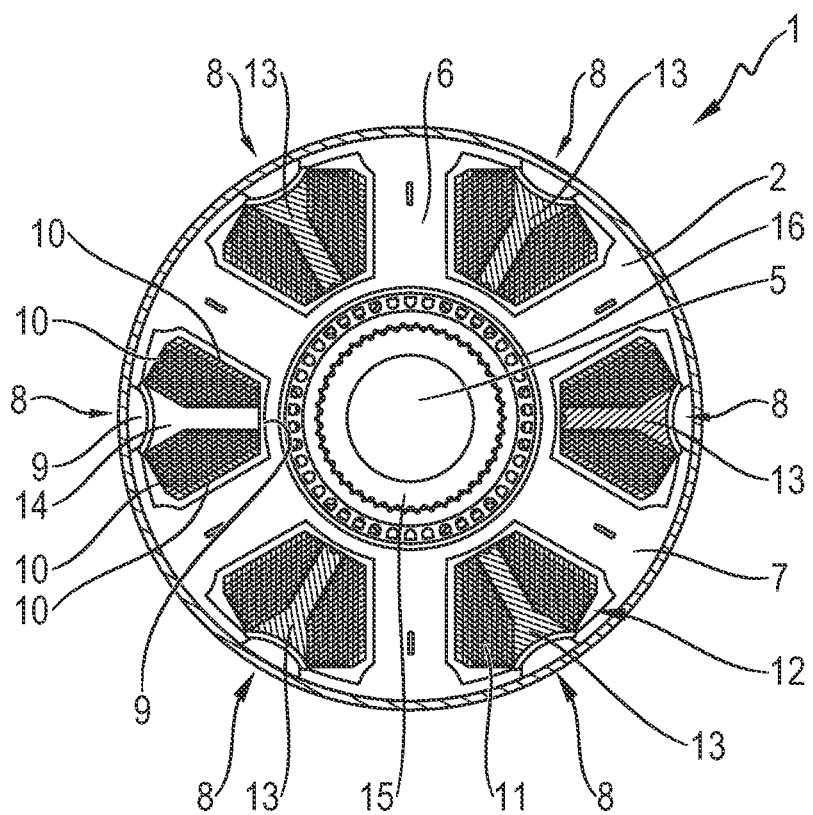
FIG. 2 shows a sectional view of the rotor of the exemplary embodiment according to the invention of the electric machine according to FIG. 1 with a section perpendicular to the rotor axis.
Figure 3:
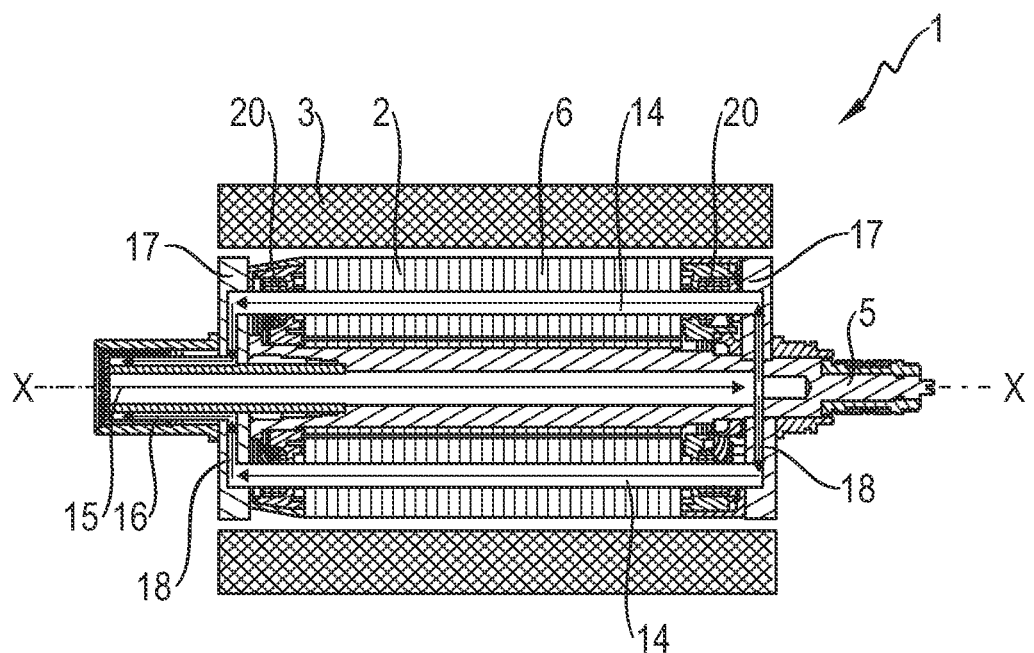
FIG. 3 shows a sectional view of an exemplary embodiment according to the invention of an electric machine with a section along the rotor axis.

The rotor core 6 comprises groove-like recesses 8, which extend toward the rotor shaft 5. The groove-like recesses 8 are arranged in a distributed, in particular evenly distributed, manner over the circumference of the rotor 2. The exemplary embodiment shown in FIG. 2 shows a rotor 2 with six groove-like recesses 8 arranged in a distributed manner over the circumference. In other exemplary embodiments, more or less such groove-like recesses 8 are also possible.

In the exemplary embodiment shown, the groove-like recesses 8 are formed in the section approximately hexagonally with narrow radially internal and external base surfaces 9 and flanks 10 expanding therebetween, which flanks run toward one another at an obtuse angle.

Electrically conductive conductors 11 of a rotor winding 12 and a displacement body 13 for arranging the conductors 11 in the groove-like recess 8 are provided in the respective groove-like recesses 8.

Figure 4:
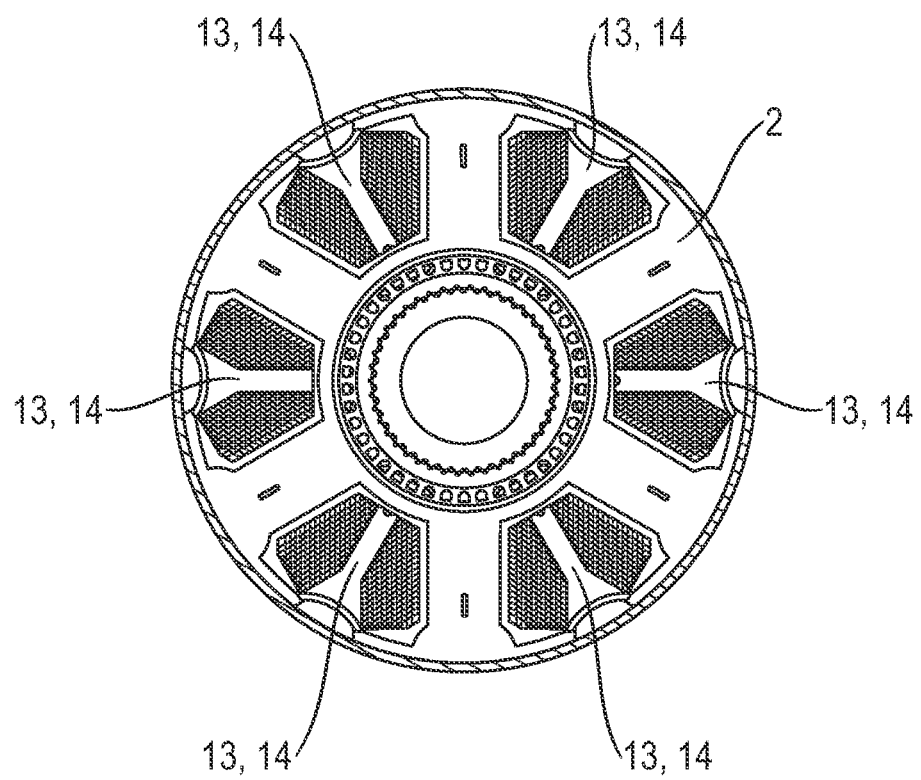
FIG. 4 shows a sectional view of the rotor of the exemplary embodiment according to the invention of the electric machine according to FIG. 3 with a section perpendicular to the rotor axis.
Figure 5:
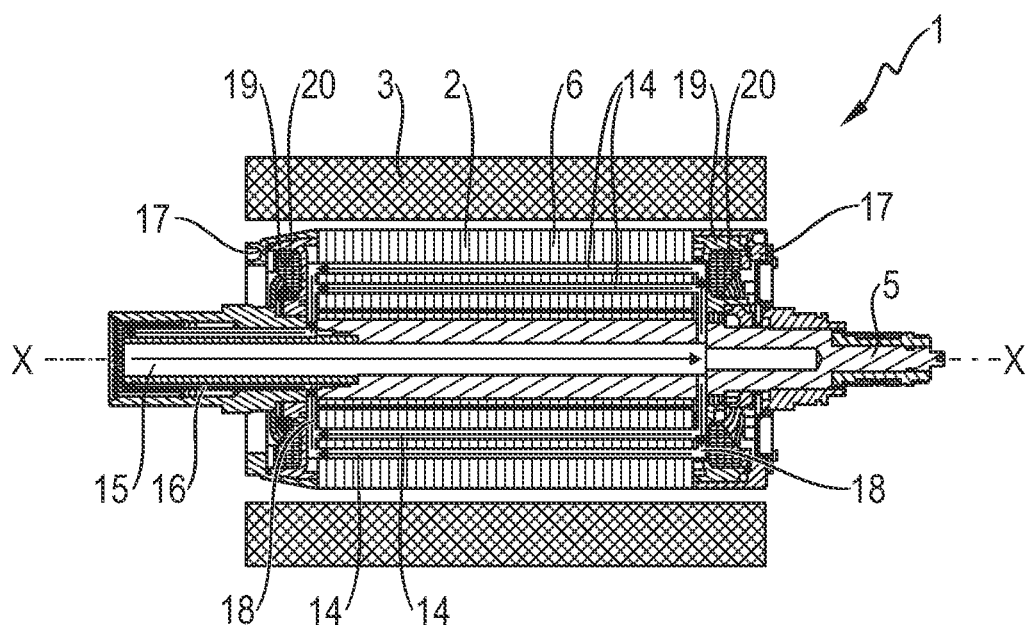
FIG. 5 shows a sectional view of an exemplary embodiment according to the invention of an electric machine with a section along the rotor axis.
Figure 6:
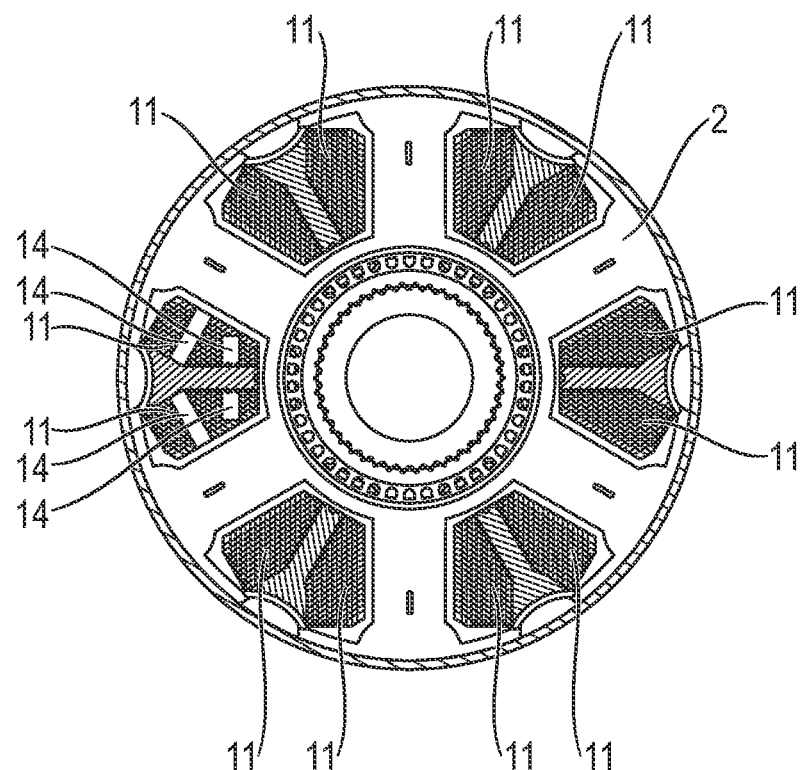
FIG. 6 shows a sectional view of the rotor of the exemplary embodiment according to the invention of the electric machine according to FIG. 5 with a section perpendicular to the rotor axis.

FIGS. 2, 4, and 6 show that the conductors 11 are arranged on both sides of the displacement body 13. This may also be designed otherwise.

The conductors 11 of the rotor winding 12 can be formed as round wire conductors, hairpin conductors, shaped rod conductors, or as shaft winding elements.

For cooling the rotor 2, at least one cooling channel 14, which extends in the longitudinal direction of the rotor shaft 5, is also arranged in at least one groove-like recess 8.

FIG. 2 shows a cooling channel 14 in a groove-like recess 8. In other exemplary embodiments, at least one cooling channel 14, which extends in the longitudinal direction of the rotor shaft 5, can be arranged in a plurality of groove-like recesses 8 or in each groove-like recess 8, see in this regard also FIG. 4, which alternatively shows a rotor 2, in which a cooling channel 14 is provided in each displacement body 13.

The at least one cooling channel 14 can be arranged in the displacement body 13, as can be seen in FIG. 2.

In another exemplary embodiment, the at least one cooling channel 14 can also alternatively or additionally be arranged and/or formed between the conductors 11 of the rotor winding 12, as shown, for example, in FIG. 6. At least one cooling channel 14, advantageously, for example, two or more cooling channels 14, is provided in each group of conductors 11 on both sides of the displacement body 13.

The at least one cooling channel 14 can be formed integrally with the displacement body 13, for example by an injection molding process or the like, or the cooling channel 14 can also be integrated into the displacement body 13, for example as a tube, which is inserted into a recess of the displacement body 13, and/or the cooling channel 14 can also be inserted into the displacement body 13.

Alternatively or additionally, the at least one cooling channel 14 or the respective cooling channel 14 can also be formed and/or inserted between the conductors 11 of the rotor winding 12, in particular formed in a manner connected to the conductors 11, see FIG. 6. It can, for example, be advantageous if the at least one cooling channel 14 is cast together with the conductors 11 of the rotor winding 12 into a casting compound. For this purpose, the respective cooling channel 14 can, for example, be formed as a tube, in particular as a plastic tube or metal tube, which is cast together with the conductors 11 into the casting compound.

For supplying a coolant to the at least one cooling channel 14, the rotor shaft 5 comprises fluid channels 15, 16 for supplying and/or discharging a coolant to the rotor 2 and/or from the rotor 2. The fluid channel 15 is provided radially inward and serves to supply the coolant, and the fluid channel 16 is arranged radially further outward and coaxially to the fluid channel 15 and serves to discharge the coolant.

Furthermore, the rotor 2 comprises a cover disk 17 on the end side at at least one axial end of the rotor core 6 or at both axial end sides of the rotor core 4, in which cover disk or in which cover disks at least one fluid channel 18 in the radial direction is provided for supplying and/or discharging a coolant to at least one cooling channel 14 in the rotor 2. The cover disks 17 thus serve for the fluid connection between the rotor shaft 5 and the cooling channels 14 of the rotor 2.

The cover disks 17 are connected in a fixed and sealed manner to the rotor core 6 of the rotor 2 at the axial ends of the rotor core 6.

The rotor 2 is preferably formed such that the rotor winding forms at least one end-side winding head 20 or end-side winding heads 20 of the electrical conductors 11. The latter are arranged in a fluid space 19 or in a fluid channel 19 of the rotor 2 and/or in a fluid channel 19 of a cover disk 17 and can be flowed around by a coolant. According to FIGS. 1 and 5, the respective winding head 20 is arranged in a fluid space 19 or fluid channel 19 of the cover disk 17 and thus supplied with and flowed around by coolant. According to FIG. 3, the respective winding head 20 is arranged in a fluid space 19 or fluid channel 19 of the rotor 2 and is supplied with coolant from a fluid channel 18 of the cover disk 17 and is flowed around by the coolant.

The stator 3 is not described further. It can also be provided with cooling channels for the flow of fluid in order to also be able to cool the stator directly. The cooling channels of the stator 3 can be integrated into the cooling circuit.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Electric machine
2 Rotor
3 Stator
4 Space area
5 Rotor shaft
6 Rotor core
7 Rotor plate
8 Recess
9 Base surface
10 Flank
11 Conductor
12 Rotor winding
13 Displacement body
14 Cooling channel
15 Fluid channel
16 Fluid channel
17 Cover disk
18 Fluid channel
19 Fluid space/fluid channel
20 Winding head

The invention claimed is:

1. An electrical machine, as a prime mover of an electrically driven motor vehicle, comprising:
a rotor; and
a stator, wherein:
the stator surrounds a substantially cylindrical space area, in which the rotor is rotatably arranged,
the rotor comprises a rotor shaft, on which a rotor core is arranged, the rotor core comprising groove-like recesses which extend toward the rotor shaft,
electrically conductive conductors of a rotor winding and a displacement body for arranging the conductors in the groove-like recess are provided in the groove-like recesses,
at least one cooling channel, which extends in a longitudinal direction of the rotor shaft, is arranged in at least one groove-like recess, the at least one cooling channel being configured to receive a flow of a coolant into an interior of the at least one cooling channel,
the rotor comprises a cover disk on an end side at at least one axial end of the rotor core or at both axial end sides of the rotor core,
at least one fluid channel is provided in the cover disk or cover disks for supplying and/or discharging the coolant to the at least one cooling channel in the at least one groove-like recess of the rotor,
the rotor winding forms at least one end-side winding head of the electrical conductors,
the at least one winding head is arranged in the at least one fluid channel of the cover disk or cover disks such that coolant flows against and cools the at least one winding head and subsequently flows into the at least one cooling channel in the at least one groove-like recess of the rotor, or such that the coolant flows out of the at least one cooling channel in the at least one groove-like recess of the rotor and subsequently flows against and cools the at least one winding head.

2. The electrical machine according to claim 1, wherein the rotor core is formed from a package of rotor plates.

3. The electrical machine according to claim 1, wherein at least one cooling channel, which extends in the longitudinal direction of the rotor shaft, is arranged in a plurality of groove-like recesses or in each groove-like recess.

4. The electrical machine according to claim 1, wherein the at least one cooling channel is arranged and/or formed in the displacement body and/or between the conductors of the rotor winding.

5. The electrical machine according to claim 4, wherein the at least one cooling channel is formed integrally with the displacement body or is integrated into the displacement body and/or is inserted into the displacement body and/or is formed and/or inserted between the conductors of the rotor winding in a manner connected to the conductors.

6. The electrical machine according to claim 5, wherein the at least one cooling channel is cast together with the conductors of the rotor winding into a casting compound.

7. The electrical machine according to claim 1, wherein the rotor shaft forms fluid channels for supplying and/or discharging the coolant to the rotor and/or from the rotor.

8. The electrical machine according to claim 1, wherein the conductors of the rotor winding are formed as round wire conductors, hairpin conductors, shaped rod conductors, or as shaft winding elements.

9. The electrical machine according to claim 1, wherein the rotor shaft includes a first fluid channel configured to supply the flow of the coolant along the longitudinal direction of the rotor shaft.

10. The electrical machine according to claim 9, wherein the first fluid channel supplies the flow of the coolant to the at least one cooling channel.

11. The electrical machine according to claim 10, wherein the rotor shaft includes a second fluid channel configured to discharge the coolant from the at least one cooling channel.

12. The electrical machine according to claim 11, wherein the second fluid channel is configured to discharge the flow of the coolant in a direction opposite the flow of the coolant in the first fluid channel.

13. The electrical machine according to claim 12, wherein the rotor includes a third fluid channel and a fourth fluid channel, the third fluid channel being configured to supply the flow of the coolant in a radial direction away from the rotor shaft to the at least one cooling channel, and the fourth fluid channel being configured to discharge the flow of the coolant in a radial direction towards the rotor shaft from the at least one cooling channel.

14. The electrical machine according to claim 1, wherein the rotor comprises a first cover disk at a first axial end side of the rotor core and a second cover disk at a second axial end side of the rotor core opposing the first axial end side,
wherein the rotor winding forms a first winding head and a second winding head opposing the first winding head, and
wherein the first winding head is arranged in a fluid channel of the first cover disk and the second winding head is arranged in a fluid channel of the second cover disk such that coolant flows through the at least one cooling channel, through the fluid channels of each cover disk, and against each of the first and second winding heads.

15. An electrical machine, as a prime mover of an electrically driven motor vehicle, comprising:
a rotor; and
a stator, wherein:
the stator surrounds a substantially cylindrical space area, in which the rotor is rotatably arranged,
the rotor comprises a rotor shaft, on which a rotor core is arranged, the rotor core comprising groove-like recesses which extend toward the rotor shaft,
electrically conductive conductors of a rotor winding and a displacement body for arranging the conductors in the groove-like recess are provided in the groove-like recesses,
at least one cooling channel, which extends in a longitudinal direction of the rotor shaft, is arranged in at least one groove-like recess, the at least one cooling channel being configured to receive a flow of a coolant into an interior of the at least one cooling channel,
the rotor comprises a cover disk on an end side at at least one axial end of the rotor core or at both axial end sides of the rotor core,
at least one fluid channel is provided in the cover disk or cover disks for supplying and/or discharging the coolant to the at least one cooling channel in the at least one groove-like recess of the rotor,
the rotor winding forms at least one end-side winding head of the electrical conductors,
the at least one winding head is arranged in a fluid channel of the rotor such that coolant flows against and cools the at least one winding head and subsequently flows into the at least one cooling channel in the at least one groove-like recess of the rotor, or such that the coolant flows out of the at least one cooling channel in the at least one groove-like recess of the rotor and subsequently flows against and cools the at least one winding head.

16. The electrical machine according to claim 15, wherein the rotor winding forms a first winding head and a second winding head opposing the first winding head, and
wherein the first winding head is arranged in a first fluid channel of the rotor at a first axial end or the rotor and the second winding head is arranged in a second fluid channel of the rotor at a second axial end of the rotor axially opposing the first axial end, and
wherein coolant flows through the at least one cooling channel, through the first and second fluid channels of the rotor, and against each of the first and second winding heads.

17. The electrical machine according to claim 15, wherein the at least one fluid channel provided in the cover disk is delimited entirely by the cover disk.

* * * * *